US011585366B2

(12) United States Patent
Chopard et al.

(10) Patent No.: US 11,585,366 B2
(45) Date of Patent: Feb. 21, 2023

(54) FIXING DEVICE AND METHOD FOR MANUFACTURING SUCH A DEVICE

(71) Applicant: BOLLHOFF OTALU S.A., La Ravoire (FR)

(72) Inventors: Jérôme Chopard, Chambéry (FR); Jean-François Jambut, Saint Jeoire Prieuré (FR); Loïc Roques, Florentin (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 344 days.

(21) Appl. No.: 16/641,515

(22) PCT Filed: Aug. 28, 2018

(86) PCT No.: PCT/EP2018/073085
§ 371 (c)(1),
(2) Date: Feb. 24, 2020

(87) PCT Pub. No.: WO2019/042966
PCT Pub. Date: Mar. 7, 2019

(65) Prior Publication Data
US 2021/0131473 A1    May 6, 2021

(30) Foreign Application Priority Data

Aug. 30, 2017 (FR) ........................................ 1757986
Mar. 5, 2018 (FR) ........................................ 1851891

(51) Int. Cl.
*G01L 1/20* (2006.01)
*F16B 31/02* (2006.01)
(Continued)

(52) U.S. Cl.
CPC .............. *F16B 31/02* (2013.01); *G01L 1/183* (2013.01); *G01L 1/20* (2013.01); *G01L 5/246* (2013.01); *F16B 2031/022* (2013.01)

(58) Field of Classification Search
CPC ............. F16B 31/02; G01L 1/20; G01L 5/246
See application file for complete search history.

(56) References Cited

U.S. PATENT DOCUMENTS 4,052,628 A    10/1977 Hayer
4,586,377 A    5/1986 Schmid
(Continued)

FOREIGN PATENT DOCUMENTS

DE    19710960 A1    9/1998
DE    19831270 A1    1/2000
(Continued)

OTHER PUBLICATIONS

Written Opinion & International Search Report for PCT/EP2018/073085 dated Nov. 15, 2018, 11 pages.
(Continued)

*Primary Examiner* — Jamel E Williams
(74) *Attorney, Agent, or Firm* — Reising Ethington P.C.; Matthew J. Schmidt (57) ABSTRACT

Fixing device comprising a fixing member provided with a bearing head, a sensor provided with a detector of the mechanical force to which the fixing member is subjected, the detector being mounted in contact with the fixing member, and a connecting component which is electrically connected to the sensor, which is configured to transmit a measurement of a mechanical force provided by the sensor and which is mounted on the fixing member, the fixing member comprising a body which is mounted on the bearing head and which extends along a longitudinal axis protruding from the bearing head.

12 Claims, 11 Drawing Sheets

(51) Int. Cl.
*G01L 1/18* (2006.01)
*G01L 5/24* (2006.01)

(56) References Cited

U.S. PATENT DOCUMENTS

| | | | | |
|---|---|---|---|---|
| 5,297,430 | A * | 3/1994 | Sonderegger | G01L 5/243 |
| | | | | 73/862.68 |
| 6,272,936 | B1 | 8/2001 | Oreper et al. | |
| 8,511,175 | B2 | 8/2013 | Hoering et al. | |
| 9,651,433 | B2 * | 5/2017 | Matsuzawa | G01L 5/009 |
| 9,784,627 | B2 * | 10/2017 | Saito | H01L 41/125 |
| 2004/0050182 | A1 * | 3/2004 | Dukart | G01L 1/14 |
| | | | | 73/862.625 |
| 2004/0129092 | A1 | 7/2004 | Dietzel | |
| 2006/0123917 | A1 * | 6/2006 | Kibblewhite | G01L 5/246 |
| | | | | 73/761 |
| 2014/0190267 | A1 | 7/2014 | Mekid et al. | |
| 2017/0021504 | A1 | 1/2017 | Matsuzawa et al. | |

FOREIGN PATENT DOCUMENTS

| | | | |
|---|---|---|---|
| DE | 202004002116 U1 | 6/2004 | |
| DE | 102009043267 A1 | 4/2011 | |
| EP | 2339310 A2 | 6/2011 | |
| FR | 2887955 A1 | 1/2007 | |
| WO | WO-9001153 A * | 2/1990 | ........... G01L 19/003 |
| WO | WO02069666 A2 | 9/2002 | |
| WO | WO2017141247 A2 | 8/2017 | |

OTHER PUBLICATIONS

EP Office Action for EP Application No. 18759953.5 dated Nov. 17, 2022 (7 pages).

* cited by examiner

FIXING DEVICE AND METHOD FOR MANUFACTURING SUCH A DEVICE

TECHNICAL FIELD

The disclosure relates to fixing devices and more particularly to fixing devices in which it is desirable to measure the mechanical forces to which these devices are subjected.

BACKGROUND

The international application WO02/069666 discloses a device for measuring pressure, temperature, impulses and expansion on a flexible hose during the use thereof. The hose comprises an end piece connected to one end of the hose, a sensor being located in the end piece for each measured value, and comprises a measuring unit located in or on the wall of the flexible hose. The measuring unit is coupled to the sensor by wired connections. However, such a device is not a fixing member designed to fix two mechanical parts together.

The German utility model DE 202004002116 discloses a connection element for connecting conductor lines for liquids or gases, or electrical or optical media, comprising a sleeve, a connector designed to be assembled to the sleeve and an electrical conductor which is configured to close a circuit by cooperating with an electrical contact when the assembly of the connector with the sleeve is correct. Moreover, the electrical conductor is mounted on the connector and is coupled to an antenna and a passive transponder, and the electrical contact is mounted on the sleeve. The French patent application FR 2887955 discloses a device for connecting two tubular elements for transporting fluids comprising a female end piece, a male end piece designed to be inserted into the female end piece, a locking member, a proximity sensor to determine the position of the locking member, and a radio frequency tag connected to an antenna in order to transmit the determined position. The proximity sensor may be fixed to the female end piece or the locking member. However, these measuring apparatuses do not permit the measurement of a mechanical force to which the connecting devices are subjected.

The German patent application DE 19831270 discloses a mechanical device for the assembly of two metal plates by means of a fixing screw. The tightened and deformed state of the screw is monitored by means of a sensor comprising at least one film made of piezoelectric material which is fixed either to the head of the screw or distributed at an angle along the shank of the screw. The sensor is directly connected via a connecting circuit to an electronic processing device which is arranged on the outside. However, it may be necessary to provide connecting circuits which are sufficiently long when the electronic device is very remote from the screw.

Moreover, the American patent U.S. Pat. No. 5,297,430 discloses a force sensor in the form of a thin disc located between a nut and a cylinder of a marine diesel engine. The sensor comprises four cells for measuring Z-forces integrated inside a principal metal housing. The cells may comprise quartz discs of the piezoelectric type. The sensor also comprises four electrodes connected to a pre-amplifier which is housed in a connecting housing juxtaposed with the principal housing. Such a sensor is used as a washer placed between a nut and a part. However, these sensors are independent of the nut and the cylinder and thus are not suitable for every type of nut.

It is also possible to cite the American patent U.S. Pat. No. 6,272,936 which discloses a pressure sensor comprising a pressure detector connected to two electrodes, the detector comprising a printed variable resistance ink. However, such a sensor provides a single type of measurement. This sensor is not suitable for measuring the different types of mechanical stresses to which a fixing member is subjected, such as in particular vibrations.

SUMMARY

An object of at least some implementations of the invention may consist in remedying these drawbacks and more particularly in providing a compact device incorporating or integrating the necessary equipment for measuring a mechanical force to which the fixing device is subjected, i.e. which enables information to be provided about the several types of mechanical forces to which the fixing device is subjected.

According to one feature, a fixing device is proposed, said fixing device comprising a fixing member provided with a bearing head, a first sensor provided with a first detector of the mechanical force to which the fixing member is subjected, the first detector being mounted in contact with the fixing member, and a connecting component which is electrically connected to the first sensor, which is configured to transmit a measurement of a mechanical force provided by the sensor and which is mounted on the fixing member.

As an alternative to the connecting component, a second sensor is provided having a second detector of the mechanical force to which the fixing member is subjected, wherein the first and the second detectors are superposed on top of one another along an axis.

The fixing member comprises a body which is mounted on the bearing head and which extends along a longitudinal axis protruding from the bearing head.

A device is thus provided which is equipped with a force sensor and provided with an electronic component, which is configured to transmit the information measured by the sensor, and which is particularly compact.

The body may be a hollow cylinder.

The body may comprise an internal thread.

The fixing member may be made of polymer material or of metal.

The body and the bearing head may form the same part.

The detector may be embedded inside the fixing member.

The device may comprise an electrically insulating coating mounted on the fixing member, such that the detector is located between the fixing member and the coating.

The body may comprise fixing elements cooperating with complementary parts provided on the bearing head in order to mount the body on the bearing head.

The bearing head may be made of polymer material.

The connecting component may be mounted on the bearing head.

The device may comprise a support mounted on the fixing member, such that the detector is located between the fixing member and the support.

The support may be an electronic printed circuit board and the connecting component is mounted on the board.

The sensor may comprise a processing unit which is mounted on the connecting member, which is connected to the detector and which is configured to carry out the measurement of the mechanical force.

The detector may consume electrical energy in order to function and the connecting component is also configured to supply the detector with electricity.

The detector may be a deformation gauge.

The detector may be a polymer material having a piezoelectric property.

According to a further embodiment as indicated above, said fixing device comprising a support, the fixing member is mounted on the support, the fixing member having the bearing head and the body mounted on the bearing head and extending along a longitudinal axis, the device further comprising the first sensor provided with the first detector of the mechanical force to which the fixing member is subjected and a first pair of electrodes electrically connected to the first detector and the second sensor provided with the second detector of the mechanical force to which the fixing member is subjected and a second pair of electrodes electrically connected to the second detector, wherein the first and the second detectors are superposed on top of one another along the axis passing via the support and the bearing head.

The first and second detectors are superposed on top of one another along an axis passing via the support and the bearing head.

Thus a device which is equipped with a plurality of mechanical force sensors and which is particularly compact is provided.

The first sensor may be configured to provide information relative to a vibration to which the fixing member is subjected.

The second sensor may be configured to provide information relative to a constant force applied to the fixing member.

Such a device equipped with two sensors providing separate information makes it possible to measure the vibrations to which the fixing member is subjected and a constant force applied to the fixing member.

The first detector may be an ink having a piezoelectric property.

The second detector may be an ink having variable electrical resistance as a function of a constant force applied to the second detector.

The second detector is supplied with electricity by means of the second pair of electrodes.

The first and second detectors may each have an annular shape at least partially surrounding the body of the fixing member.

The fixing device may comprise an insulating element placed between the first and second detectors.

According to a further feature of the invention, a method for manufacturing a fixing device is proposed, comprising:

a mounting of a detector in contact with a fixing member; and a mounting of a connecting component on the fixing member, the fixing component being electrically connected to the sensor.

The method further comprises a mounting of a body of the fixing member onto a bearing head of the fixing member, such that the body extends along a longitudinal axis protruding from the bearing head.

BRIEF DESCRIPTION OF THE DRAWINGS

Further advantages and features will be revealed more clearly from the following description of particular embodiments and implementations given by way of non-limiting examples and shown in the accompanying drawings, in which.

DETAILED DESCRIPTION

Various embodiments of a fixing device 1 have been shown in FIGS. 1 to 20. Generally, the fixing device 1 comprises a fixing member 2 provided with a bearing head 3 and a body 4 mounted on the bearing head 3. More particularly, the body 4 extends along a longitudinal axis A protruding from the bearing head 3. In other words, the bearing head 3 has a first surface 24 and a second surface 25 opposing the first surface, the second surface forming a shoulder with the body 4 of the fixing member 2. In other words, the bearing head 3 extends transversely to the body 4 along a transverse axis B. The transverse axis B is perpendicular to the longitudinal axis A. The body 4 provides the function to the fixing member 2. Generally, the fixing member 2 makes it possible to fix two parts together. The body 4 may be a hollow cylinder. By "cylinder" is understood a solid shape delimited by a cylindrical surface generated by a set of parallel lines, denoted the generatrices, resting on a closed plane curve, denoted the directrix, and two planes intersecting the generatrices. The body 4 may be deformable and the member 2 may be a rivet or an insert which is able to be crimped. The body 4 may comprise an internal thread and the member 2 is a nut. The body 4 may be solid and comprise an external thread and the member 2 is a screw. The fixing member 2 may be produced from a single part, i.e. the bearing head 3 and the body 4 form the same part 2. As a variant, the bearing head 3 and the body 4 are two separate parts. More particularly, the body 4 is said to be mounted on the bearing head 3. In other words, the body 4 is fixed mechanically to the bearing head 3. The body 4 and the bearing head 3 are also said to form an assembly where the elements of the member 2 are held in contact against one another. For example, the body 4 and the bearing head 3 form a single part 2 as illustrated in FIGS. 11, 12 and 15 to 18. As a variant, the body 4 comprises fixing elements 5 cooperating with complementary parts 6 provided on the bearing head 3 in order to mount the body 4 on the bearing head 3. In this case, the body 4 may be fixedly or removably mounted on the bearing head 3. The fixing member 2 may be made of metal or of polymer material. When the member 2 comprises two separate parts 3, 4, these parts may be metal or one part may be made of metal and the other part may be made of polymer material, or the two parts may be made of polymer material. The fact that the body 4 is located so as to protrude from the bearing head 3 makes the body 4 accessible and may contribute to the fixing of a part 20 to a support part 21, as illustrated in FIGS. 17 to 20.

Figure 17:
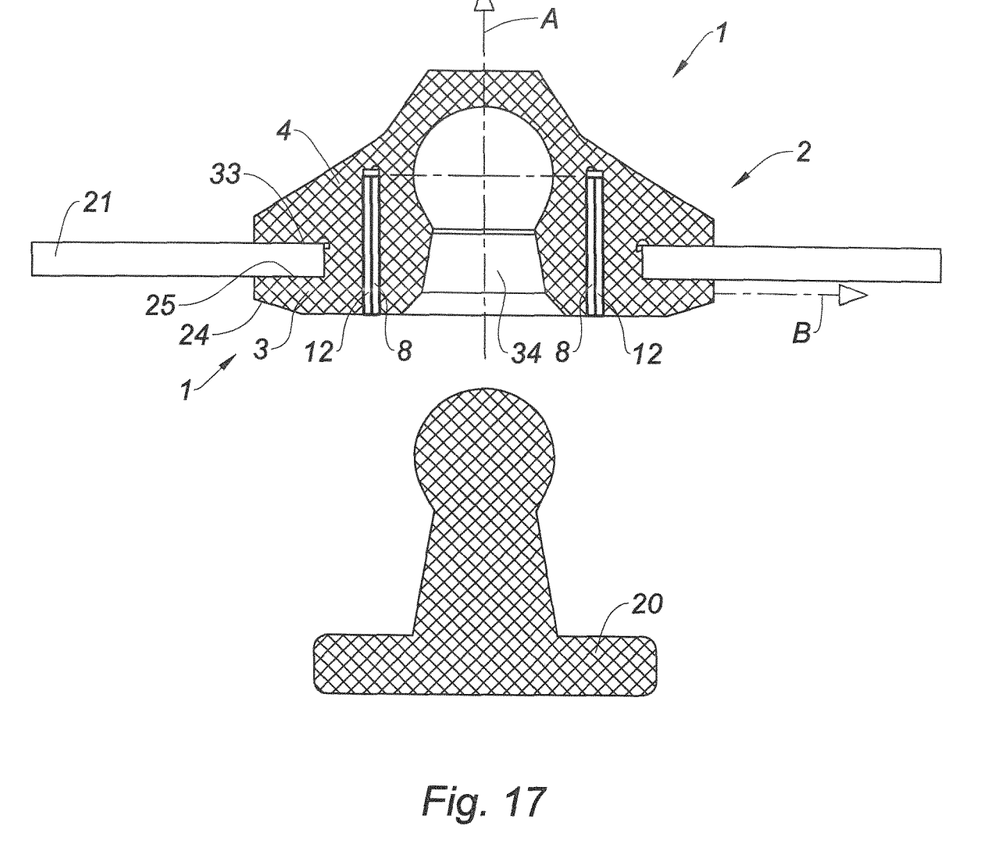
Figure 18:
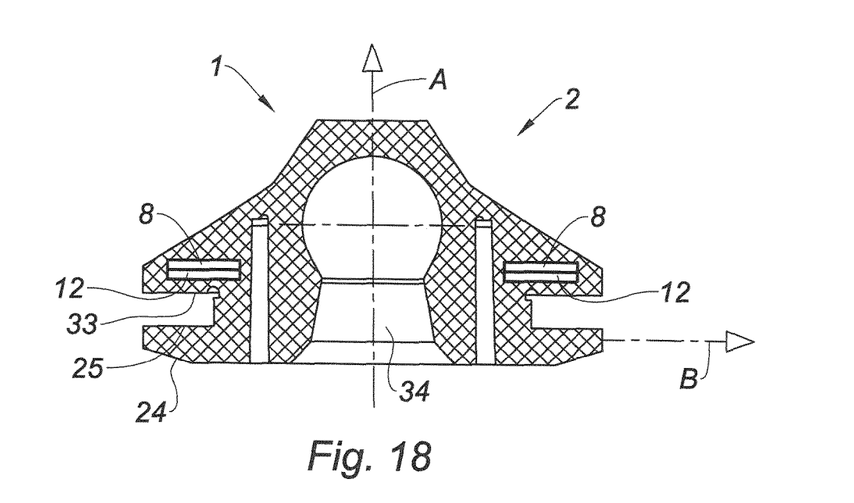

The device 1 further comprises a sensor 7 to measure a mechanical force to which the fixing member 2 is subjected. The mechanical force measured may be a deformation, a vibration, an expansion, a weight, a pressure or an acceleration. The sensor 7 comprises a detector 8 of the mechanical force. The sensor 7 may also comprise a processing unit 9 connected to the detector 8 by means of two electrodes 22, 23. The processing unit 9 is also configured to carry out the measurement of the mechanical force from information provided by the detector 8. The information provided is representative of the mechanical force to which the fixing member 2 is subjected. The processing member 9 may be a microprocessor. The detector 8 is mounted in contact with the fixing member 2. For example, the detector 8 may be embedded inside the fixing member 2 as illustrated in FIGS. 17 and 18. According to a further embodiment, the detector 8 is in contact with the fixing member 2 as illustrated in FIGS. 1 to 16. For example, the detector 8 may be mounted in direct contact with the fixing member 2 as illustrated in FIGS. 1 to 16. As a variant, which is not shown for the purposes of simplification, the detector 8 may be covered in its entirety by a coating to form an assembly, the assembly being mounted in direct contact with the fixing member 2. According to a further example, illustrated in FIGS. 4 to 6, the detector 8 is partially covered by a coating 10 mounted on the detector 8 so that the detector 8 is located between the fixing member 2 and the coating 10. The coating 10 may be an electrical insulator. The coating 10 may protect the detector 8 from possible external impacts. The coating 10 may be a resin.

Figure 13:
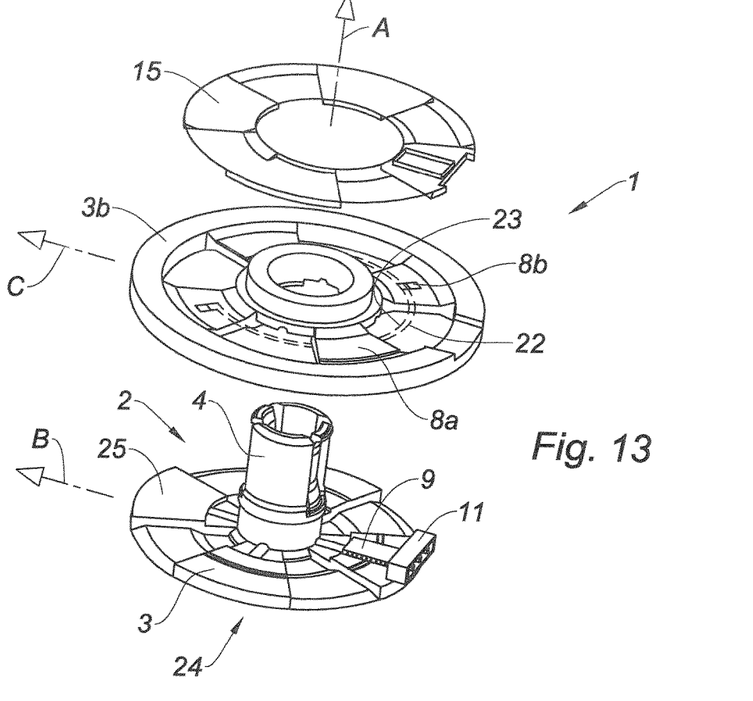
FIG. 13 illustrates schematically an exploded perspective view of a sixth embodiment of a fixing device.
Figure 14:
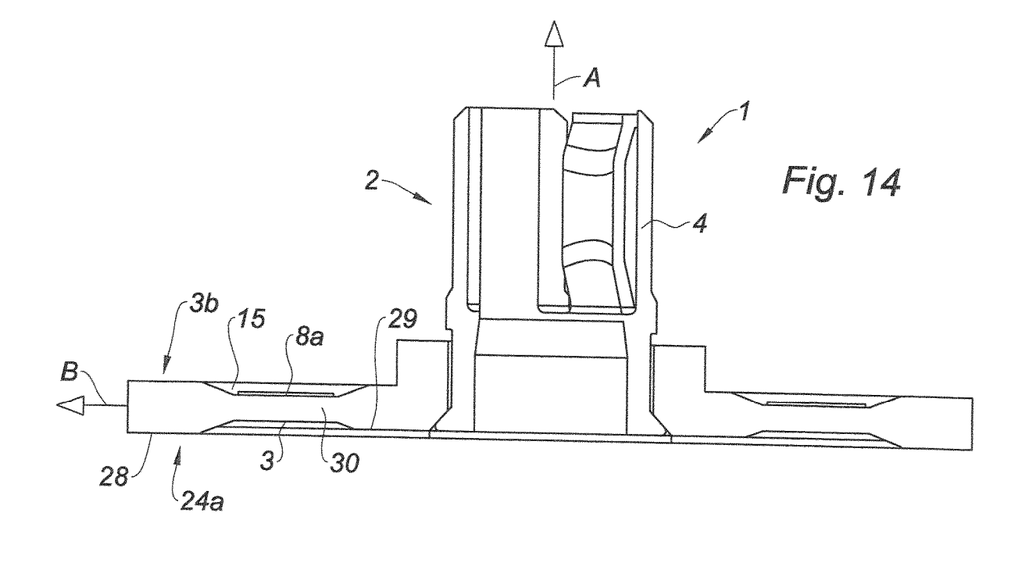
FIG. 14 illustrates schematically a sectional view of the device of FIG. 13 where the elements of the device are assembled.
Figure 15:
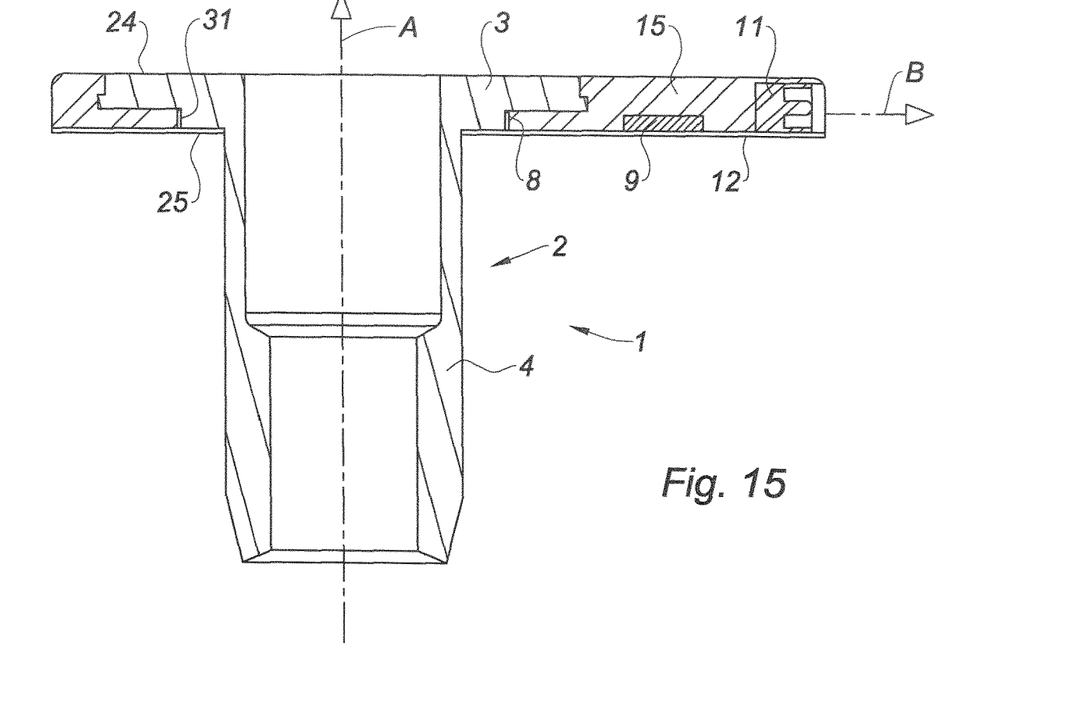
FIGS. 15 to 18 illustrate schematically further sectional views of further embodiments of a fixing device.

The detector 8 may be autonomous and in this case it does not have to consume electrical energy in order to function. For example, the detector 8 is a polymer material having a piezoelectric property, such as piezoelectric quartz or polyvinyl fluoride. In this case, when the detector 8 is subjected to a mechanical force, it generates a difference in potential which may be measured by the processing unit 9. The detector 8 may also consume electrical energy to function and the detector 8 is said to be electro-active. For example, the detector 8 is a deformation gauge, or microelectromechanical system having micrometric dimensions. Moreover, the detector 8 may also be an electro-active polymer material such as an ink, a paste or a metal electro-active paint or made of a conductive polymer material or a combination of the two. In this case, an electric current is provided to the detector 8 and when the detector 8 is subjected to a mechanical force, its resistance varies and it is possible for this variation in resistance to be measured by the processing unit 9. The sensor 7 may also comprise a plurality of detectors 8. For example, as illustrated in FIGS. 13 to 15, the device 1 comprises both an ink having a piezoelectric property 8*a* placed on the bearing head 3 and a deformation gauge 8*b* also placed on the bearing head 3.

Moreover, the device 1 comprises a connecting component 11 which is electrically connected to the sensor 7. For example, the connecting component 11 is connected to the sensor 7 by means of electrodes 22, 23. The component 11 is configured to receive the measurement of mechanical force provided by the sensor 7 and to transmit the measurement to an analysis and processing system located outside the device 1 or integrated in the device 1, for example by being mounted on the fixing member 2. The component 11 is mounted on the fixing member 2. For example, the component 11 is an electrical connector or a radio frequency antenna. In the case where the detector 8 is electro-active, the connecting component 11 is also configured for supplying electricity to the detector 8.

Figure 7:
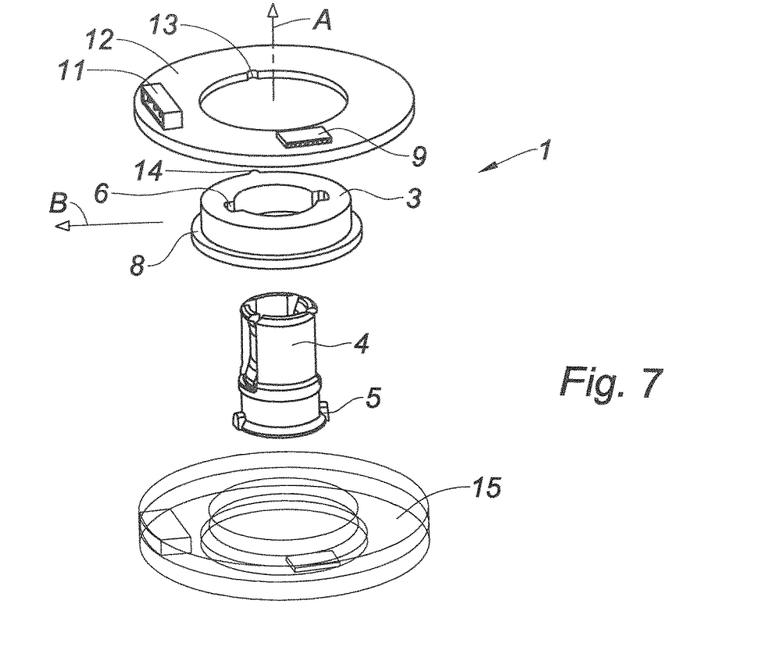
FIG. 7 illustrates schematically an exploded perspective view of a third embodiment of a fixing device.
Figure 8:
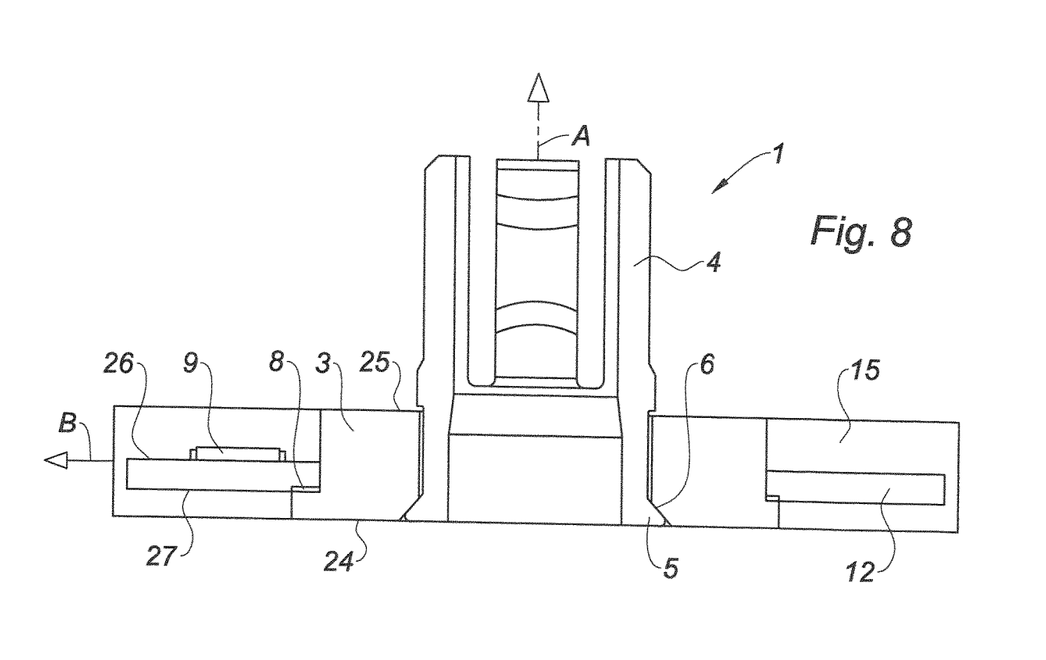
FIG. 8 illustrates schematically a sectional view of the device of FIG. 7 where the elements of the device are assembled.

Moreover, the fixing device 1 may comprise a support 12 mounted on the fixing member 1 so that the detector 8 is located between the fixing member 2 and the support 12. The support 12 permits, in particular, a face of the detector 8, in particular the face which is not in contact with the fixing member 2, to be protected. The support 12 may also permit the electronic components of the device 1, such as the connecting component 11 and the processing unit 9, to be supported. In other words, the connecting component 11 and the processing unit 9 may be mounted directly on the support 12. The support 12 may be made of polymer material. The support 12 may be an electronic printed circuit board. For example, it may be an electronic board produced from polycarbonate or epoxy resin. For example, the support 12 comprises lugs and/or notches 13 which respectively cooperate with notches and/or lugs 14 provided on the fixing member 2 as illustrated in FIGS. 7 and 8. As a variant, the support 12 is mounted on a housing 15, said housing being mounted on the fixing member 2 as illustrated in FIGS. 1 to 6 and 9 to 12. The housing 15 may be produced from resin. The housing 15 thus comprises lugs and/or notches 16 which respectively cooperate with notches and/or lugs 17 provided on the fixing member 2. The housing 15 may be made of polymer material. The housing 15 may also be mounted on the fixing member 2 by being injection-moulded onto the fixing member 2.

Figure 1:
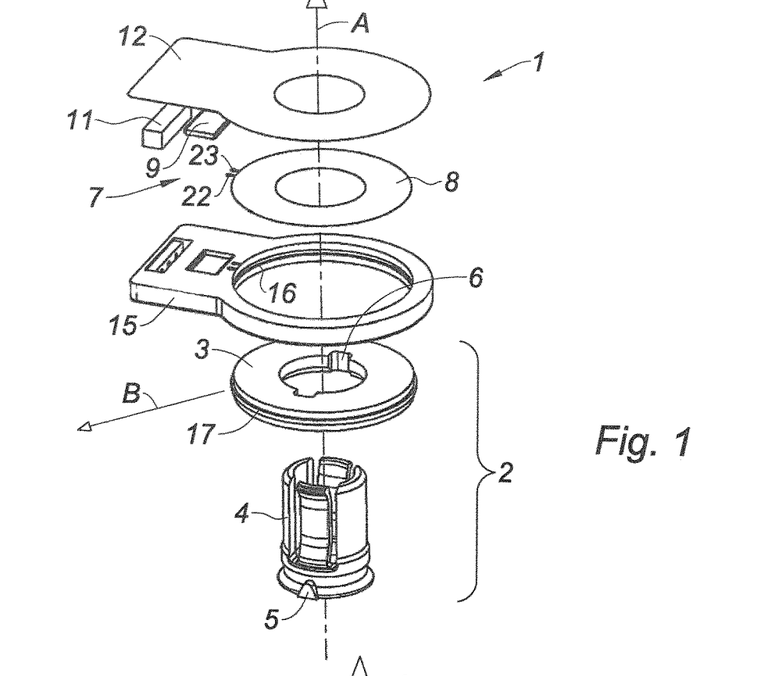
FIG. 1 illustrates schematically an exploded perspective view of an embodiment of a fixing device.
Figure 2:
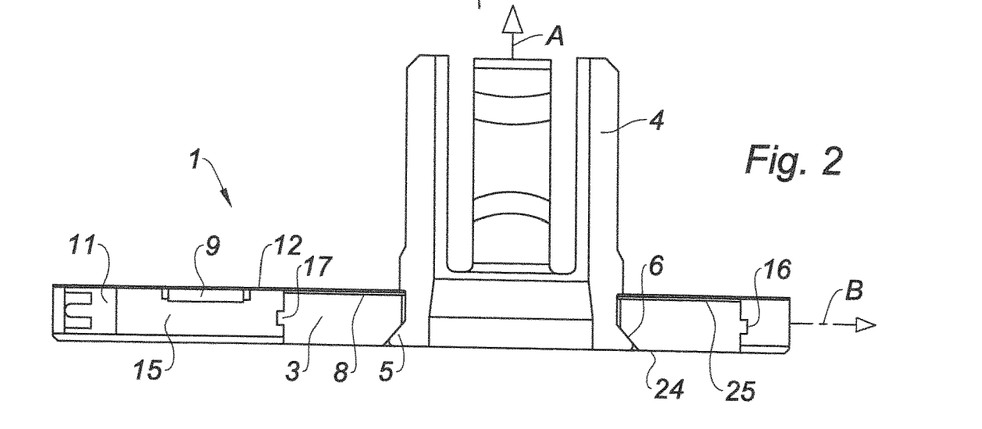
FIG. 2 illustrates schematically a sectional view of the device of FIG. 1 where the elements of the device are assembled.
Figure 3:
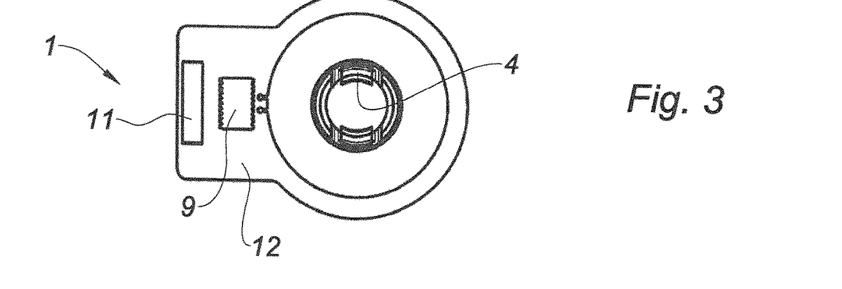
FIG. 3 illustrates schematically a view from below of the device of FIG. 1 where the elements of the device are assembled.

An embodiment in which the detector 8 is configured according to a planar ring, permitting a passage of the body 4 of the fixing member 2, is shown in FIGS. 1 to 3. In other words, an orifice 18 for the passage of the body 4 is formed within the sensor 5.

Figure 4:
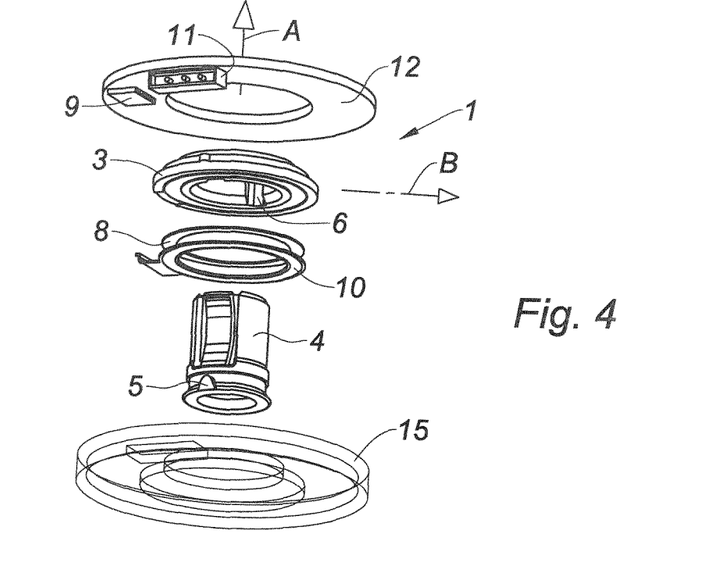
FIG. 4 illustrates schematically an exploded perspective view of a second embodiment of a fixing device.
Figure 5:
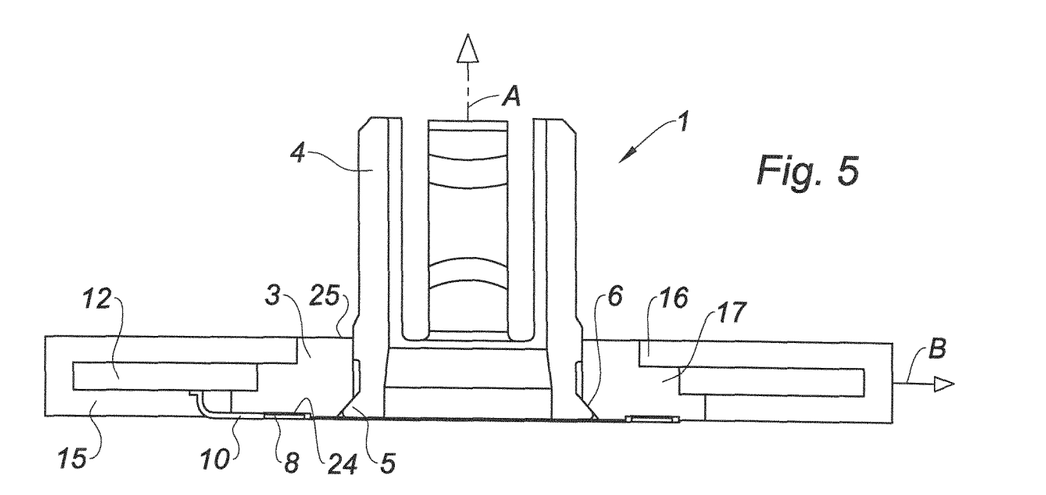
FIG. 5 illustrates schematically a sectional view of the device of FIG. 4 where the elements of the device are assembled.
Figure 6:
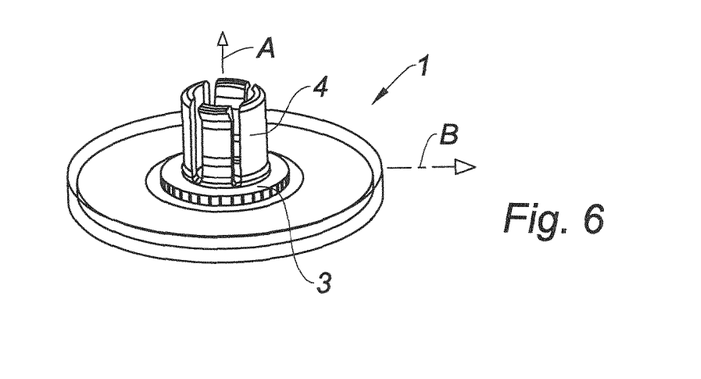
FIG. 6 illustrates schematically a perspective view from above of the device of FIG. 4 where the elements of the device are assembled.

In FIGS. 4 to 6, the detector 8 is located on the first surface 24 of the bearing head 3.

In FIGS. 7 and 8, the electronic components 9 and 11 are located on a first surface 26 of the support 12 opposing a second surface 27, the detector 8 being mounted on said second surface.

Figure 9:
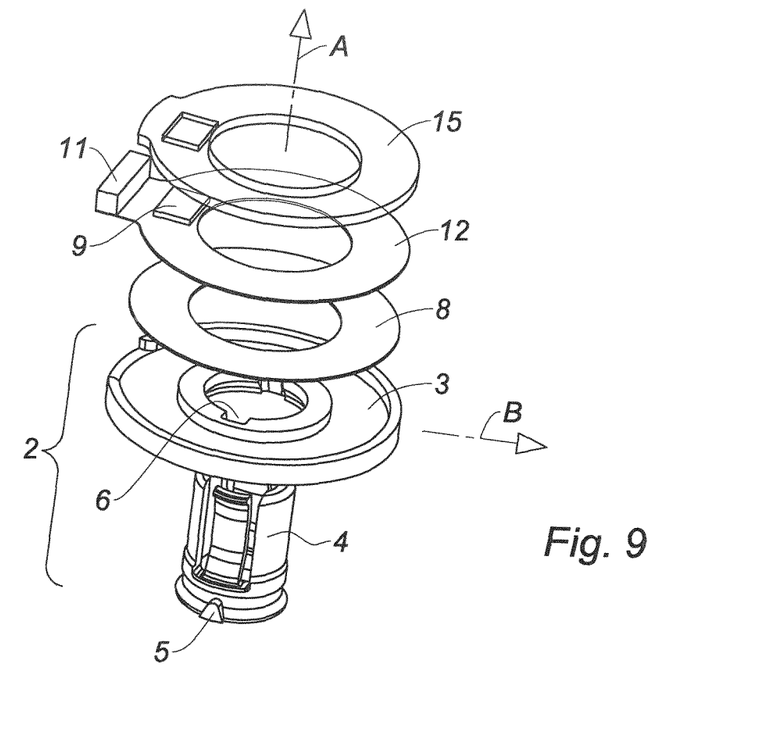
FIG. 9 illustrates schematically an exploded perspective view of a fourth embodiment of a fixing device.
Figure 10:
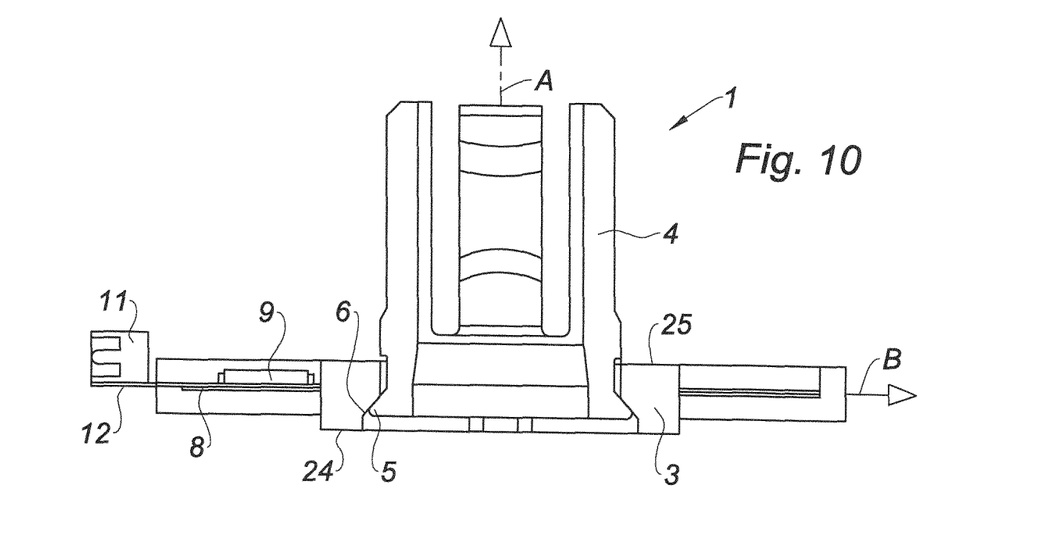
FIG. 10 illustrates schematically a sectional view of the device of FIG. 9 where the elements of the device are assembled.

In FIGS. 9 and 10, the connecting component 11 is mounted on the support 12, outside the housing 15.

Figure 11:
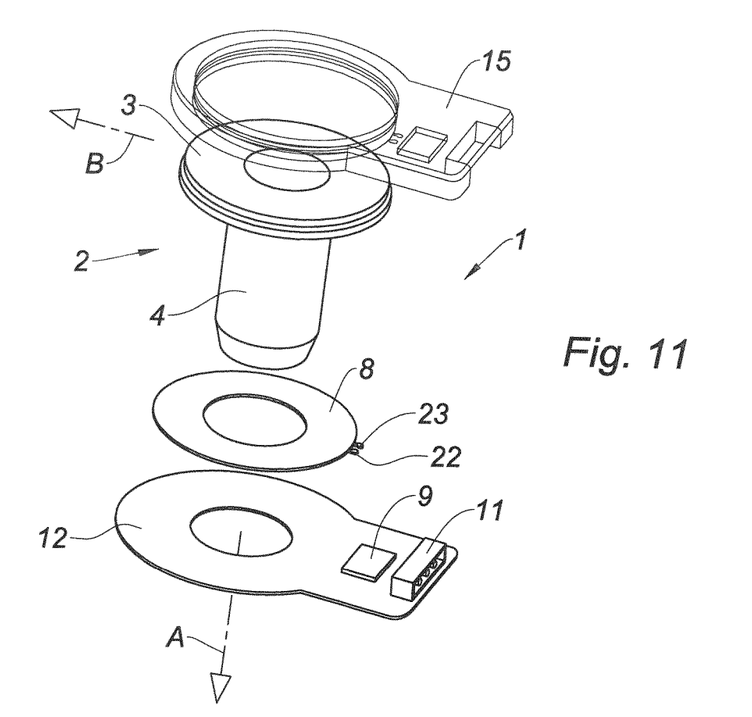
FIG. 11 illustrates schematically an exploded perspective view of a fifth embodiment of a fixing device.
Figure 12:
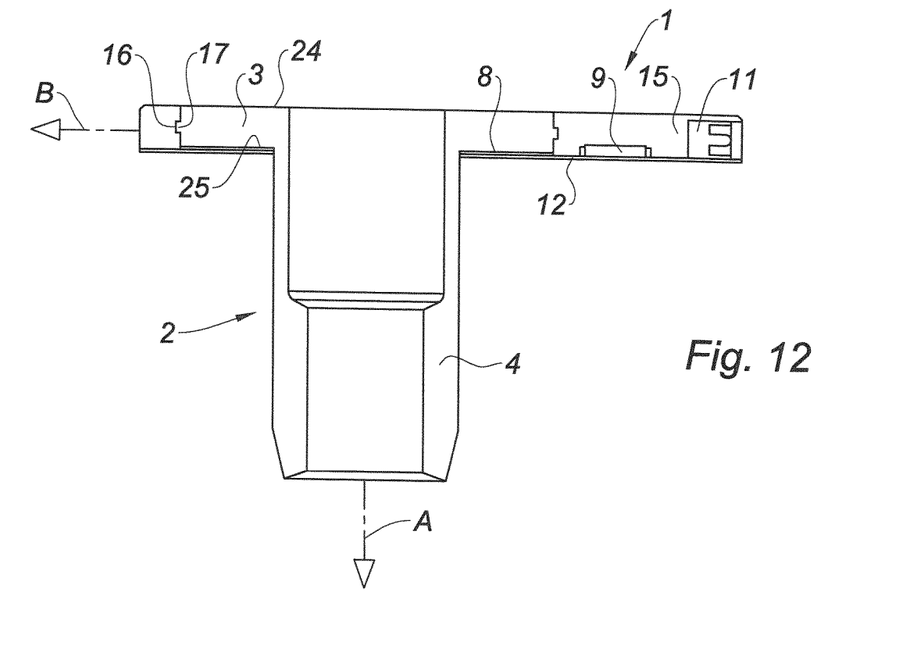
FIG. 12 illustrates schematically a sectional view of the device of FIG. 11 where the elements of the device are assembled.

In FIGS. 11 and 12, the fixing member 2 is formed from a single part.

In FIGS. 13 and 14 a further embodiment has been shown in which the bearing head 3 is made of polymer material. In this further embodiment, the connecting component 11 and the measuring unit 9 are mounted on the bearing head 3. Moreover, the device 1 comprises a complementary head 3b mounted on the bearing head 3. The complementary head 3b may be made of metal or polymer. The complementary head 3b extends along an axis C parallel to the transverse axis B. The complementary head 3b comprises a first surface 24a having a distal region 28 and a proximal region 29 relative to the body 4. The two regions 28, 29 are connected together by an arm 30. More particularly, the distal region 28 is lower than the region 29 opposite the longitudinal axis A of the fixing member 2. This difference in height permits a flexion of the arm 30 and absorbs the deformations generated by a mechanical force applied to the fixing member 2. The absorption permits a progressive deformation of the detector 8 and contributes to its protection.

In FIG. 15 an embodiment has been shown in which the detector 8 extends along the longitudinal axis A and is in contact with the bearing head 3, in particular in contact with a surface 31 extending perpendicular to the first and second surfaces 24, 25 of the bearing head 3.

Figure 16:
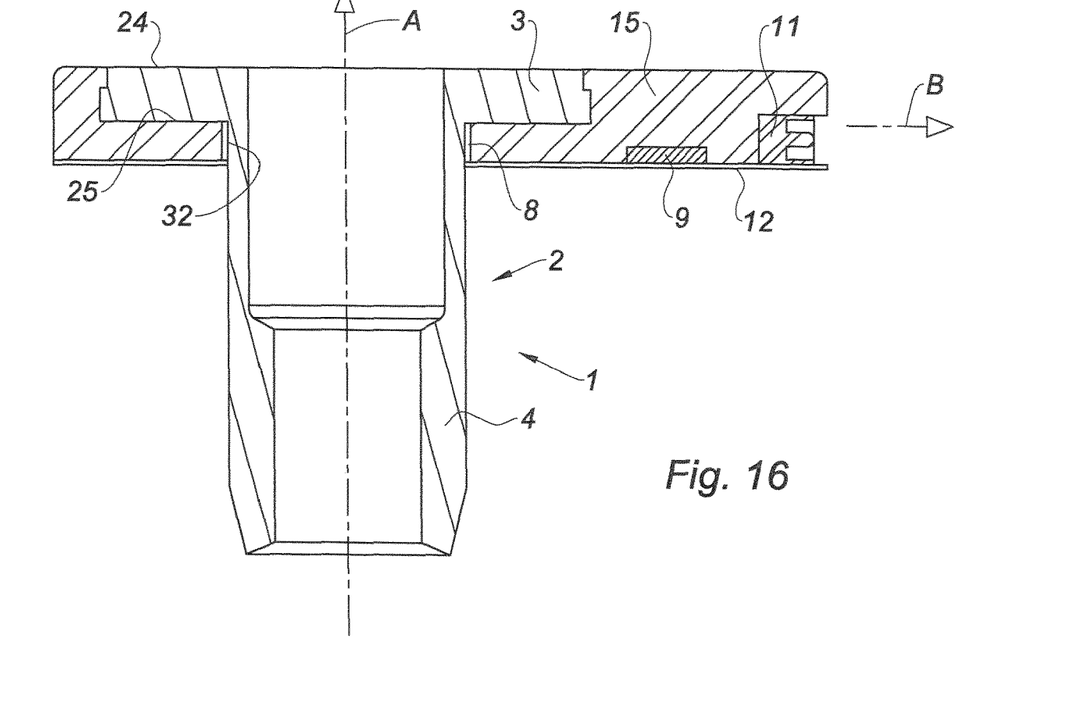

In FIG. 16 a further embodiment has been shown in which the detector 8 extends along the longitudinal axis A and is in contact with the body 4 of the fixing member 2, in particular in contact with an external surface 32 of the body 4.

In FIGS. 17 and 18 a fixing device 1 has been shown in which the bearing head 3 and the body 4 form the fixing member 2 in a single piece. In particular, the body 4 protrudes from the second surface of the bearing head 3. The fixing member 2 may be a coupler by spherical interlocking. For example, the member 2 may be made of elastomer. The body 4 further comprises a shoulder 33 located opposite the second surface 25 and extending along an axis parallel to the transverse axis B. Thus a part support 21 in the form of a plate may be introduced between the shoulder 33 and the second surface 25. Moreover, the body 4 comprises a housing 34 capable of receiving a part 20 having a spherical head. The detector 8 is mounted on the support 12 of the device 1 and the assembly comprising the support 12 and the detector 8 is mounted inside the fixing member 2, in particular inside a housing provided in the body 4 of the member 2. The connecting component 11 and the processing unit 9 are mounted on the support 12. In this embodiment, the detector 8 extends parallel to the longitudinal axis A. As a variant, as illustrated in FIG. 18, the detector 8 extends perpendicular to the longitudinal axis A.

Figure 19:
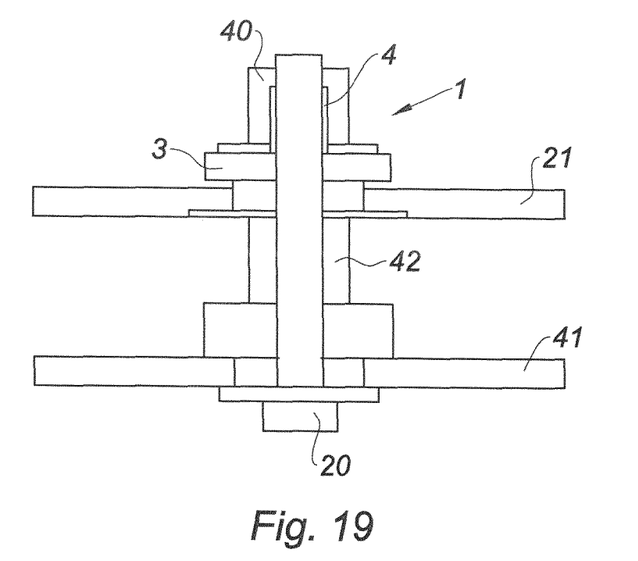
FIGS. 19 and 20 illustrate schematically two sectional views of two embodiments of a fixing device.

In FIG. 19 an embodiment has been shown in which the fixing device 1 has its body 4 mounted inside a nut 40 and its bearing head 3 is placed so as to bear against a first part support 21. A screw 20 is screwed into the nut 40 and bears against a second part support 41. A spacer 42 is placed between the first and second part supports 21, 41. According to this embodiment, the fixing device 1 has a function of a washer bearing between the nut 40 and the first part support 21.

Figure 20:
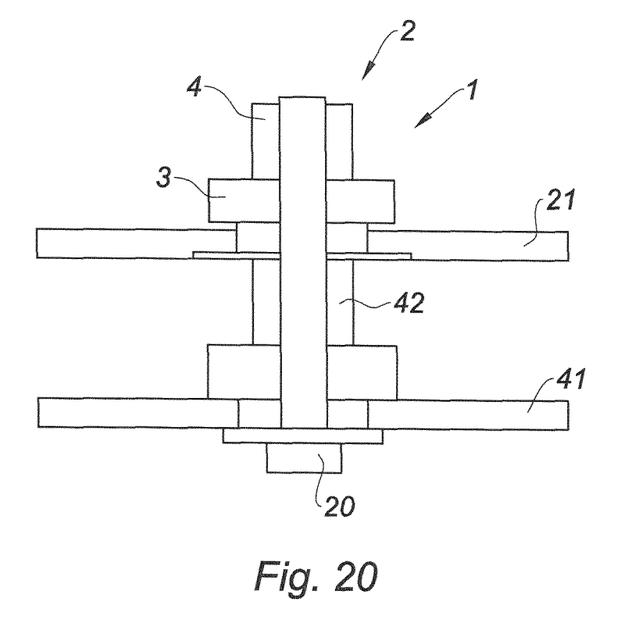

In FIG. 20 a further embodiment has been shown in which the fixing device 1 has its bearing head 3 positioned so as to bear against a first part support 21 and a screw 20 is screwed into the hollow of the body 4 of the device 1. The screw 20 bears against a second part support 41. A spacer 42 is placed between the first and second part supports 21, 41. According to this embodiment, the fixing device 1 has the function of a nut to hold the screw 20 fixed to the part supports 21, 41.

The disclosure which has been described above provides a compact fixing device 1 having an integrated sensor 7 for measuring mechanical force. The integration of the sensor 7 and the electronic components 9, 11 inside the fixing device 1 make it possible to carry out on-board diagnostics in various sectors, in particular the automotive, aeronautical and railway sectors. Thus it is possible to detect noises or abnormal behaviour, or overloads. The preventative maintenance of the vehicles or apparatuses may also be improved.

Figure 21:
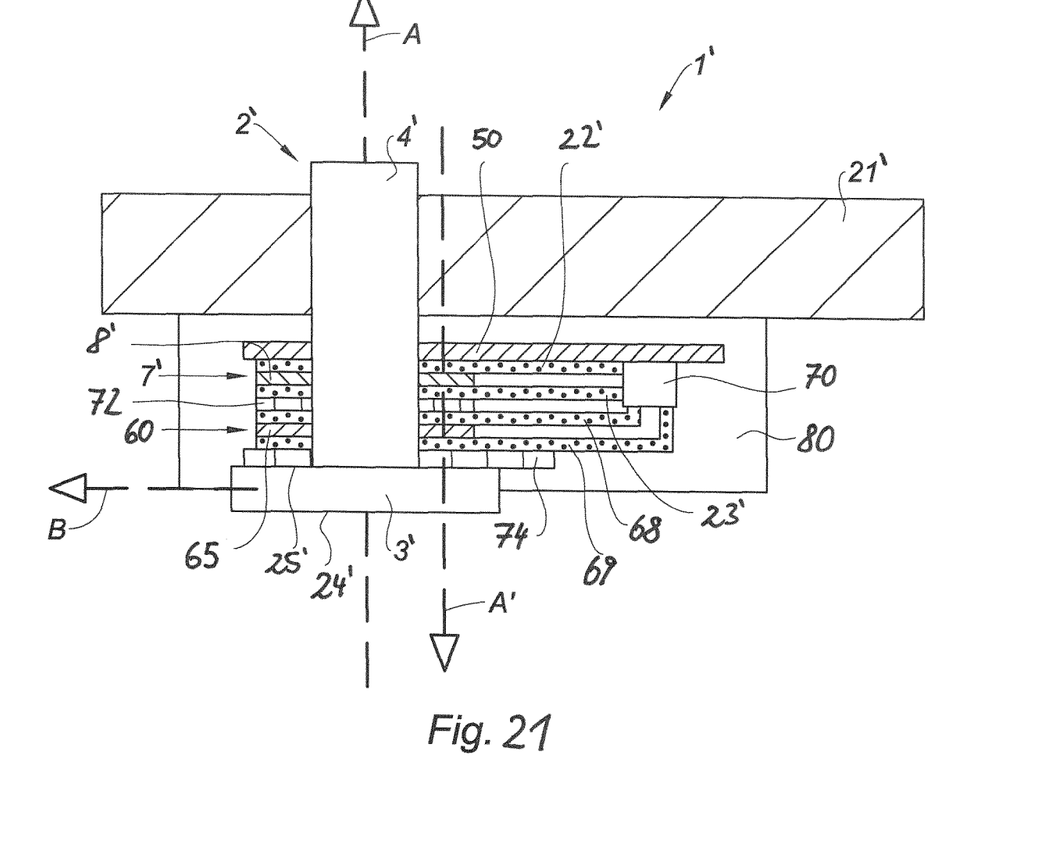
FIG. 21 illustrates schematically a sectional view of an embodiment of a device.
Figure 22:
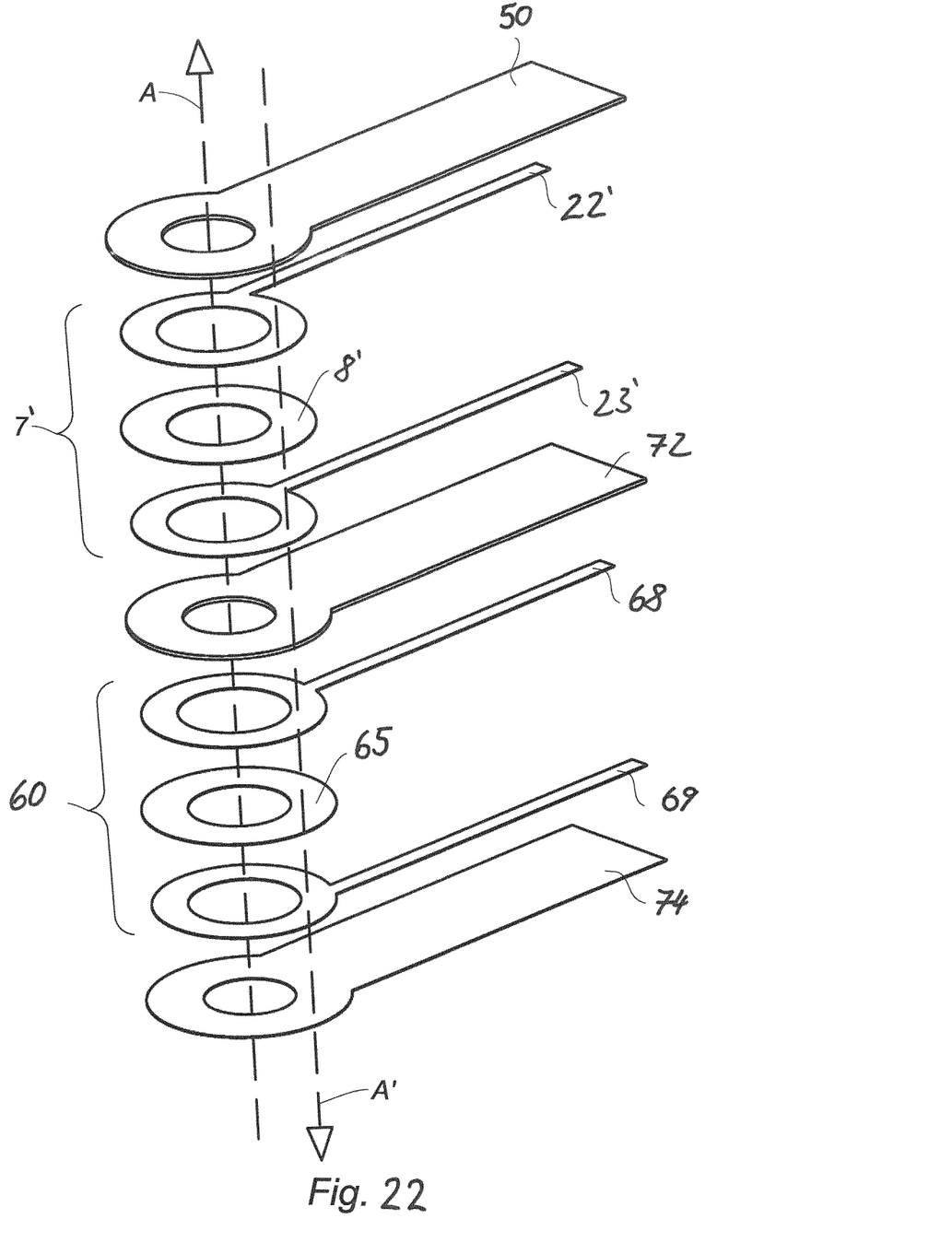
FIG. 22 illustrates schematically an exploded perspective view of the sensors of the fixing device illustrated in FIG. 21.

A further embodiment of the fixing device 1' has been shown in FIGS. 21 and 22. Generally, the fixing device 1' comprises a fixing member 2' provided with a bearing head 3' and a body 4' mounted on the bearing head 3'. More particularly, the body 4' extends along a longitudinal axis A protruding from the bearing head 3'. In other words, the bearing head 3' has a first surface 25' located opposite the body 4' and a second surface 24' opposing the first surface, the first surface 25' forming a shoulder with the body 4' of the fixing member 2'. In other words, the bearing head 3' extends transversely to the body 4' along a transverse axis B. The transverse axis B may be perpendicular to the longitudinal axis A. The body 4' provides the function to the fixing member 2'. Generally, the fixing member 2' is designed to be mounted on a part 21'. The body 4' may be a hollow cylinder. By "cylinder" is understood a solid shape delimited by a cylindrical surface generated by a set of parallel lines, denoted generatrices, resting on a closed plane curve, denoted the directrix, and two planes intersecting the generatrices. The body 4' may be deformable and the member 2' may be a rivet or an insert which is able to be crimped. The body 4' may comprise an internal thread and the member 2' is a nut. The body 4' may be solid and comprise an external thread and the member 2' is a screw. The fixing member 2' may be produced from a single part, i.e. the bearing head 3' and the body 4' form the same part 2'. As a variant, the bearing head 3' and the body 4' are two separate parts. More particularly, the body 4' is said to be mounted on the bearing head 3'. In other words, the body 4' is mechanically connected to the bearing head 3'. The body 4' and the bearing head 3' are also said to form an assembly where the elements of the member 2 are held in contact against one another. As a variant, the body 4' comprises fixing elements cooperating with complementary parts provided on the bearing head 3' in order to mount the body 4' on the bearing head 3'. According to this variant, the body 4' may be fixedly or removably mounted on the bearing head 3'. When the body 4' is fixedly mounted, it may not be removed from the bearing head 3' without destroying the head 3' or the body 4'. When the body 4' is removably mounted, it may be removed from the bearing head 3' in a non-destructive manner in order to be able to be mounted again on the bearing head 3'. The fixing member 2' may be made of metal or of polymer material. When the member 2' comprises two separate parts 3', 4', these parts may be metal or one part may be made of metal and the other part may be made of polymer material, or the two parts may be made of polymer material. The fact that the body 4' is located so as to protrude from the bearing head 3' makes the body 4' accessible and may contribute to the fixing of a further part, not shown for the purposes of simplification, to the body 4'.

The device 1' further comprises a support 50 and two sensors 7', 60. The fixing member 2' is mounted on the support 50. The two sensors 7', 50 permit the measurement of the mechanical forces to which the fixing member 2' is subjected. A mechanical force may be a deformation, a vibration, an expansion, a weight or a pressure. The vibrations, considered as "dynamic" forces, are distinguished from other stresses considered as "static" forces. In other words, it is considered that a vibration is a force which varies during the measurement thereof. In contrast, a static force is a constant force, i.e. a force having a constant value over the course of a specific time period during which this force is measured. A constant force is, for example, a load placed in contact with the fixing member 2'.

The first sensor 7' comprises a first detector 8' of mechanical force and a first pair of electrodes 22', 23' electrically connected to the first detector 8'. The second sensor 60' comprises a second detector 65 of mechanical force and a second pair of electrodes 68, 69 electrically connected to the second detector 65.

The fixing device 1' may also comprise an electronic monitoring unit 70 connected to the first and second detectors 8', 65 by means of two pairs of electrodes 22', 23', 68, 69. The electronic monitoring unit 70 may also be configured to carry out the measurements of mechanical forces from information provided by the sensors 7', 60, in particular by the detectors 8', 65 via the electrodes 22', 23', 68, 69. The information provided by a detector 8', 65 is representative of a mechanical force to which the fixing member 2' is subjected. The electronic monitoring unit 70 may be a microprocessor.

More particularly, the first and second detectors 8', 65 are superposed on top of one another along an axis A' passing via the support 50 and the bearing head 3'.

This layered arrangement of the detectors 8', 65 permits the fixing device 1' to be made particularly compact. For example, the axis A' is parallel to the longitudinal axis A in order to facilitate the manufacture of the device 1'. In other words, the support 50, the first detector 8', the second detector 65 and the bearing head 3' are located along the axis A' which passes via the support 50 and the bearing head 3'. According to one embodiment, each detector 8', 65 is placed between two electrodes of the pair associated with the detector 8', 65. An insulating element 72 may be placed between two electrodes respectively connected to the first and second detectors 8', 65 so as to insulate the electrical circuits associated with the detectors 8', 65. Optionally, it is possible to place an additional insulating element 74 between the bearing head 3' and the electrode 69 connected to the second detector 65 which is located closest to the bearing head 3'. Thus it is possible to produce an assembly comprising the support 50 and the additional insulating element 74, the sensors 7', 60 being placed therebetween. Such an assembly permits the formation of a block on which the fixing member 2' is mounted. In this case, detectors 8', 65 in which an orifice may be formed may be provided. An orifice permits a passage of the body 4' of the fixing member 2'. The electrodes 22', 23', 68, 69, the support 50, the insulating element 72 and the additional insulating element 74 may also be provided with an orifice for the passage of the body 4' of the fixing member 2' as illustrated in FIG. 22. The orifices are formed such that when the elements of the assembly are superposed on top of one another, the orifices of the elements coincide with one another. For example, the elements are placed so that the longitudinal axis A passes via each of the orifices of the elements.

The insulating elements 72, 74 may be produced from a resin.

In FIG. 22, the support 50, the first electrode 22' of the first pair, the first detector 8', the second electrode 23' of the first pair, an insulating element 72, the first electrode 68 of the second pair, the second detector 65, the second electrode 69 of the second pair and an additional insulating element 74 are located along the axis A'.

The first detector 8' may be configured to provide information relative to the vibrations to which the fixing member 2' is subjected. According to one embodiment, the first detector 8' has piezoelectric properties, i.e. the detector 8', when it is deformed in a particular direction by the action of a mechanical stress, has positive and negative loads in certain regions of its surface. The quantity of loads is proportional to the stress exerted and disappears when the stress is eliminated and the first detector 8' adopts its initial shape again. The first detector 8' may be resilient. The loads created generate a difference in potential which may be measured by the electronic monitoring unit 70. Since the difference in potential is relative to the force applied to the first detector 8', the difference in potential permits the measurement of the stress exerted on the fixing member 2'. The first detector 8' may be a first ink with piezoelectric properties, which permits a fixing device 1' which may be particularly compact to be provided. For example, the first ink may be produced from graphene, i.e. a material having a crystalline allotropic form of carbon. The first detector 8' may be autonomous and in this case it does not have to consume electrical energy in order to function. For example, the first detector 8' comprises a polymer material having a piezoelectric property, such as piezoelectric quartz or polyvinyl fluoride. The first detector 8' may also consume electrical energy in order to function and the first detector 8' is said to be electro-active. For example, the first detector 8' is a microelectromechanical system having micrometric dimensions and being of the accelerometer type. Such a detector 8' is particularly suitable for measuring vibrations. Moreover, the first detector 8' may also be an electro-active polymer material, such as an ink, a paste or a metal electroactive paint, or a conductive polymer material or a combination of the two.

The second detector 65 may be configured to provide information relative to a constant force applied to the fixing member 2'. According to a further embodiment, the second detector 65 has a variable electrical resistance as a function of a mechanical stress and the second detector 65 is also said to have "piezoresistive" properties. In other words, when a force is applied to the second detector 65, the second detector 65 is deformed. The deformation may result from a flexion or compression exerted on the second detector 65. The flexion or compression causes a variation in length of the second detector 65 in a particular direction. The deformation modifies the electrical resistance of the second detector 65. The variation in resistivity of the second detector 65 is a function of the mechanical stress exerted on the second detector 65. In particular, the second detector 65 is resilient and when the mechanical stress disappears, the second detector 65 adopts its shape again and its electrical resistance adopts its initial value again. The deformation of the second detector 65 generates a difference in electrical resistance which may be measured by the electronic monitoring unit 70. For example, the second detector 65 is a deformation gauge, for example a gauge produced from silicon. The second detector 65 may be a second ink having a variable electrical resistance as a function of a constant force applied to the second ink. For example, the second ink may be produced from a conductive oxide, such as lead oxide, ruthenium oxide or bismuth oxide or a mixture of these conductive oxides. In particular, the second detector 65 is supplied with electricity by the electronic monitoring unit 70 via the second pair of electrodes 68, 69 to provide information relative to a constant force applied to the fixing member 2'. Thus the second detector 65 is said to be electro-active. The information provided by the second detector 65 is a value of electrical resistance relative to the mechanical force applied to the second detector 65.

By using two separate detectors 8', 65, by using two inks of separate types, a fixing device 1' may be provided which permits the measurement of vibrations and a constant mechanical stress applied to the same fixing member 2'. Thus it is possible to measure the vibratory effects and a load applied to a part 21' fixed to the fixing device 1'.

For example, the first and second detectors 8', 65 each have an annular shape at least partially surrounding the body 4' of the fixing member 2'. For example, the annular shape is closed and the detection surface is increased in order to improve the accuracy of the measurements. It is also possible to select an annular shape which is not closed in order to reduce the quantity of ink to be used.

The electronic monitoring unit 70 may also be configured in order to transmit the measurements which it carries out from information provided by the sensors 7', 60 to an analysis and processing system located outside the fixing device 1' or integrated in the device 1', for example by being mounted on the support 50. For example, in order to transmit the measurements the fixing device 1 may also comprise an electrical connector or a radio frequency antenna connected to the electronic monitoring unit 70.

Moreover, the fixing device 1 may comprise a housing 80 mounted on the fixing member 2' in order to protect the detectors 8', 65 during the mounting of the device 1' on the part 21'. The housing 80 may permit the elements of the first and second sensors 7', 60 to be housed as illustrated in FIG. 21. The housing 80 may also be used as an interface between the part 21' and the support 50 of the fixing device 1'. For example, the housing 80 is an electronic circuit board produced from polycarbonate or epoxy resin.

The disclosure which has been described above provides a fixing device which may be particularly compact. The integration of two sensors makes it possible to measure separate mechanical forces and makes it possible to carry out full diagnostics of the static and dynamic mechanical stresses exerted on different parts of a vehicle in various sectors, in particular the automotive, aeronautical and railway sectors. Thus it is possible to detect noises or abnormal behaviour, such as overloads.

The invention claimed is:

1. A fixing device comprising
   a. a fixing member for fixing two parts together and provided with a bearing head,
   b. an integrated first sensor provided with a first detector of the mechanical force to which the fixing member is subjected, the first detector being mounted in contact with the fixing member, and
   c. an integrated connecting component which is electrically connected to the first sensor, which is configured to transmit a measurement of a mechanical force provided by the first sensor and which is mounted on the fixing member, wherein
   d. the fixing member comprises a body which is mounted on the bearing head, which extends along a longitudinal axis protruding from the bearing head and which is a hollow cylinder, and
   e1. the body and the bearing head form the same part, or
   e2. the body comprises fixing elements cooperating with complementary parts provided on the bearing head in order to mount the body on the bearing head.

2. The device according to claim 1, wherein
   a. the body comprises an internal thread and/or wherein
   b. the fixing member is made of polymer material or of metal.

3. The device according to claim 1, wherein the body and the bearing head form the same part and wherein the detector is embedded inside the fixing member.

4. The device according to claim 1, comprising an electrically insulating coating mounted on the detector, such that the detector is located between the fixing member and the coating.

5. The device according to claim 1, alternative e2, wherein the bearing head is made of polymer material.

6. The device according to claim 5, wherein the connecting component is mounted on the bearing head.

7. The device according to one of claim 1, comprising a support mounted on the fixing member, such that the detector is located between the fixing member and the support.

8. The device according to claim 7, wherein the support is an electronic printed circuit board and the connecting component is mounted on the board.

9. The device according to claim 1, wherein the sensor comprises a processing unit which is mounted on the connecting member, which is connected to the detector and which is configured to carry out the measurement of the mechanical force, and/or wherein the detector consumes electrical energy in order to function and the connecting component is also configured to supply the detector with electricity.

10. The device according to claim 9, second alternative, wherein the detector is a deformation gauge.

11. The device according to claim 1, wherein the detector is a polymer material having a piezoelectric property.

12. A method for manufacturing a fixing device according to claim 1, comprising:
    a mounting of a detector in contact with a fixing member; and
    a mounting of a connecting component on the fixing member, the fixing component being electrically connected to the sensor; wherein
    it comprises a mounting of a body of the fixing member on a bearing head of the fixing member, such that the body extends along a longitudinal axis protruding from the bearing head.

* * * * *